United States Patent
Wada et al.

(10) Patent No.: US 11,242,414 B2
(45) Date of Patent: Feb. 8, 2022

(54) METHOD FOR MANUFACTURING POLYMER AND FLOW-TYPE REACTION SYSTEM FOR MANUFACTURING POLYMER

(71) Applicant: FUJIFILM Corporation, Tokyo (JP)

(72) Inventors: Kenji Wada, Kanagawa (JP); Kei Harada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/992,079

(22) Filed: Aug. 12, 2020

(65) Prior Publication Data
US 2020/0369793 A1 Nov. 26, 2020

Related U.S. Application Data

(63) Continuation of application No. PCT/JP2019/011991, filed on Mar. 22, 2019.

(30) Foreign Application Priority Data

Mar. 29, 2018 (JP) .............................. JP2018-064745

(51) Int. Cl.
*C08F 2/01* (2006.01)
*B01J 19/24* (2006.01)
(Continued)

(52) U.S. Cl.
CPC ............... *C08F 2/01* (2013.01); *B01J 19/242* (2013.01); *B01J 19/248* (2013.01); *C08F 2/14* (2013.01); *C08F 2/38* (2013.01); *C08K 5/56* (2013.01)

(58) Field of Classification Search
CPC .... B01J 19/0093; B01J 19/248; B01J 19/243; B01J 10/0066; B01J 19/2415;
(Continued)

(56) References Cited

FOREIGN PATENT DOCUMENTS

| EP | 3085712 | 10/2016 |
| EP | 3412690 | 12/2018 |

(Continued)

OTHER PUBLICATIONS

"International Search Report (Form PCT/ISA/210) of PCT/JP2019/011991," dated May 14, 2019, with English translation thereof, pp. 1-5.

(Continued)

*Primary Examiner* — William K Cheung
(74) *Attorney, Agent, or Firm* — JCIPRNET

(57) ABSTRACT

The present invention provides a method for manufacturing a polymer by a flow-type reaction. The method includes introducing a liquid A of an anionic polymerizable monomer, a liquid B of an anionic polymerization initiator, and a polymerization terminator into different flow paths, allowing the liquids to flow in the flow paths, allowing the liquid A and the liquid B to join together, subjecting the monomer to anionic polymerization while the liquids having joined together are flowing to downstream in a reaction flow path, and allowing a solution, which is obtained by the polymerization reaction and flows in the reaction flow path, and the polymerization terminator to join together so as to terminate the polymerization reaction and to obtain a polymer having a number-average molecular weight of 5,000 to 200,000. A static mixer is disposed in the reaction flow path, and a polymer having a number-average molecular weight equal to or greater than 2,000 is introduced into an inlet port of the (Continued)

mixer. The present invention also provides a flow-type reaction system suitable for performing the manufacturing method.

11 Claims, 1 Drawing Sheet

(51) Int. Cl.
*C08F 2/14* (2006.01)
*C08F 2/38* (2006.01)
*C08K 5/56* (2006.01)

(58) Field of Classification Search
CPC ............. B01J 19/242; B01J 19/2219; B01J 19/00889; B01J 19/24; B01J 19/245; B01J 2219/00051; C08F 2/14; C08F 2/01; C08F 2/38; C08F 4/484; C08F 112/08; C08F 2/06; C08K 5/56
USPC ........................................................ 526/64
See application file for complete search history.

(56) References Cited

FOREIGN PATENT DOCUMENTS

| JP | 2009067999 | | 4/2009 |
|---|---|---|---|
| JP | 2014177538 | | 9/2014 |
| JP | 2016-183217 A | * | 10/2016 |
| JP | 2016183217 | | 10/2016 |
| JP | 2017-066276 A | * | 4/2017 |
| JP | 2017066276 | | 4/2017 |
| WO | 0202651 | | 1/2002 |
| WO | 2017135398 | | 8/2017 |

OTHER PUBLICATIONS

"Written Opinion of the International Searching Authority (Form PCT/ISA/237) of PCT/JP2019/011991," dated May 14, 2019, with English translation thereof, pp. 1-12.
"Search Report of Europe Counterpart Application", dated May 10, 2021, pp. 1-7.
Office Action of Japan Counterpart Application, with English translation thereof, dated Apr. 20, 2021, pp. 1-8.

* cited by examiner

METHOD FOR MANUFACTURING POLYMER AND FLOW-TYPE REACTION SYSTEM FOR MANUFACTURING POLYMER

CROSS-REFERENCE TO RELATED APPLICATIONS

This application is a Continuation of PCT International Application No. PCT/JP2019/011991 filed on Mar. 22, 2019, which claims priority under 35 U.S.C. § 119 (a) to Japanese Patent Application No. 2018-064745 filed in Japan on Mar. 29, 2018. Each of the above applications is hereby expressly incorporated by reference, in its entirety, into the present application.

BACKGROUND OF THE INVENTION

1. Field of the Invention

The present invention relates to a method for manufacturing a polymer. Furthermore, the present invention relates to a flow-type reaction system used for manufacturing a polymer.

2. Description of the Related Art

Living anionic polymerization is known as a method that can realize a precise polymerization reaction in synthesizing polymers having special structures such as a monodisperse polymer, a block copolymer, a functional group-terminated polymer, a multibranched polymer, and a cyclic polymer.

Living anionic polymerization is usually performed by a batch method. However, in a case where the living anionic polymerization is performed by a batch method, the heat generated during the polymerization needs to be removed so as to inhibit side reactions such as a chain transfer reaction and a termination reaction, and accordingly, the polymerization reaction is performed at an extremely low temperature. For example, the polymerization reaction is performed by mixing an anionic polymerizable monomer with an anionic polymerization initiator in a state of cooling the monomer and the initiator at a temperature equal to or lower than −78° C. Therefore, for performing the living anionic polymerization by the batch method, cryogenic cooling facilities are required, and such a polymerization method is not suited for mass production.

In addition, the living anionic polymerization by the batch method is carried out with mechanical stirring. Therefore, the monomer or the polymerization initiator tends to be unevenly localized in the reaction system. Accordingly, in the living anionic polymerization by the batch method, there is a limit to the improvement of the dispersity of the obtained polymer, the monomer conversion rate, and the like.

In addition, there is also a method known to continuously obtain a polymer having a narrow molecular weight distribution by means of living anionic polymerization by using a flow-type reaction device such as a microreactor. For example, JP2016-183217A describes anionic polymerization of an α-alkylstyrene monomer by a flow-type reaction, in which the monomer is polymerized by a method including a step of first adjusting a raw material solution obtained by mixing the monomer with an initiator to a certain high temperature so as to activate the monomer and a step of then allowing the raw material solution to flow in a flow path and at the same time rapidly cooling the solution to a temperature of a specific range in which polymerization can occur. JP2016-183217A describes that in a case where the above method is used, a high-molecular-weight polymer having a more monodisperse molecular weight distribution is obtained.

SUMMARY OF THE INVENTION

The polymerization method described in JP2016-183217A is extremely effective for increasing the molecular weight of the obtained polymer and for causing the obtained polymer to have a monodisperse molecular weight distribution. However, as a result of the examinations performed by the inventors of the present invention from the viewpoint of industrial commercialization of the manufacturing of polymers, it has been found that the polymerization method described in JP2016-183217A sometimes results in a low monomer conversion rate and is still unsatisfactory from the viewpoint of the manufacturing efficiency, reproducibility, and the like of polymers.

Therefore, an object of the present invention is to provide a method for manufacturing a polymer by living anionic polymerization using a flow-type reaction, which makes it possible to obtain a polymer having a predetermined high molecular weight and a highly monodisperse molecular weight distribution at an excellent monomer conversion rate. Another object of the present invention is to provide a flow-type reaction system suitable for performing the manufacturing method.

The inventors of the present invention performed intensive examinations regarding a technique for obtaining a polymer, which has a certain high molecular weight and a highly monodisperse molecular weight distribution, at a high efficiency without wasting raw materials by living anionic polymerization using a flow-type reaction. As a result, it has been found that even though the polymerization reaction is applied to the flow-type reaction system, there is a limitation in obtaining a polymer having a certain high molecular weight with sufficiently increasing the monomer conversion rate. In order to determine the cause of the above problem, the inventors of the present invention repeated examinations. As a result, the inventors came up with an idea that one of the causes is that the higher the molecular weight of the polymer is during the polymerization reaction, the further the motion of the growth terminal is restricted; the increase in the molecular weight leads to the increase in the viscosity of the reaction solution; or the like. That is, the inventors considered that the increase in viscosity resulting from the increase in the molecular weight of the polymer may reduce the Reynolds number and make the reaction solution substantially in a state of laminar flow under a special reaction condition called flow-type reaction, and thus the components in the reaction solution may be prevented from being uniformly mixed together, which may be one of the causes of reducing the monomer conversion rate.

As solutions to this problem, further raising the reaction temperature, increasing the reaction time, and the like are considered. However, in a case where the living anionic polymerization is performed at a high temperature, a side reaction such as doubling of molecular weight occurs. Furthermore, in a case where the diameter and length of the reaction tube are increased while performing the reaction at a low temperature so as to improve the mixing properties, the size of the device increases, and it is difficult to design the facilities.

Under these circumstances, the inventors of the present invention further repeated examinations. As a result, the inventors have found that in order to solve the above problem, it is effective to use a method of incorporating a mixing step performed using a static mixer into the living anionic polymerization using the flow-type reaction at a point in time when the polymerization reaction in the reaction flow path is at a specific stage.

Based on this finding, examinations were further repeated, and as a result, the present invention has accomplished.

That is, the objects of the present invention have achieved by the following means.

[1] A method for manufacturing a polymer in which anionic polymerization reaction is performed by a flow-type reaction, the method including introducing a liquid A containing an anionic polymerizable monomer, a liquid B containing an anionic polymerization initiator, and a polymerization terminator into different flow paths, allowing the liquids to flow in the flow paths, allowing the liquid A and the liquid B to join together, subjecting the anionic polymerizable monomer to anionic polymerization while the liquids having joined together are flowing to downstream in a reaction flow path, and allowing a solution, which is obtained by the polymerization reaction and flows in the reaction flow path, and the polymerization terminator to join together so as to terminate the polymerization reaction and to obtain a polymer having a number-average molecular weight of 5,000 to 200,000, in which a static mixer is disposed in the reaction flow path, and a polymer having a number-average molecular weight equal to or greater than 2,000 is introduced into an inlet port of the static mixer.

[2] The method for manufacturing a polymer described in [1], in which a flow rate at which the liquid B is introduced is higher than 10 mL/min and equal to or lower than 2,000 mL/min.

[3] The method for manufacturing a polymer described in [1] or [2], in which both the flow path through which the liquid A flows and the flow path through which the liquid B flows have an equivalent diameter of 1 to 10 mm.

[4] The method for manufacturing a polymer described in any one of [1] to [3], in which a monomer conversion rate is equal to or higher than 1.0% at the inlet port of the static mixer.

[5] The method for manufacturing a polymer described in any one of [1] to [4], in which an equivalent diameter of the static mixer is 2 to 100 mm.

[6] The method for manufacturing a polymer described in any one of [1] to [5], in which a length of the reaction flow path is 3 to 100 m.

[7] The method for manufacturing a polymer described in any one of [1] to [6], in which the number of flow paths, which are connected to a joining portion of the liquid A and the liquid B and through which the liquid A flows, and the number of flow paths, which are connected to the joining portion of the liquid A and the liquid B and through which the liquid B flows, is 3 to 10 in total.

[8] The method for manufacturing a polymer described in any one of [1] to [7], in which at least one organic lithium compound or at least one organic magnesium compound is used as the anionic polymerization initiator.

[9] The method for manufacturing a polymer described in any one of [1] to [8], in which n-butyllithium is used as the anionic polymerization initiator.

[10] The method for manufacturing a polymer described in any one of [1] to [9], in which the liquid B contains an aromatic hydrocarbon.

[11] A flow-type reaction system for manufacturing a polymer by an anionic polymerization reaction, the system having a first flow path through which an anionic polymerizable monomer flows, a second flow path through which an anionic polymerization initiator flows, a third flow path through which a polymerization terminator flows, a first joining portion where the first flow path and the second flow path join together, a reaction tube connected to downstream of the first joining portion, a second joining portion where the reaction tube and the third flow path join together, and a pipe line connected to downstream of the second joining portion, in which a static mixer is disposed in the reaction tube, a polymer having a number-average molecular weight equal to or greater than 2,000 is introduced into an inlet port of the static mixer, and a polymer having a number-average molecular weight of 5000 to 200,000 is obtained from the pipe line.

In the present specification, "compound (including a polymer)" means a compound, a salt thereof, and an ion thereof. Furthermore, as long as the intended effect is brought about, "compound" also means a compound obtained by changing a portion of the structure of "compound".

In the present specification, a range of numerical values described using "to" means a range including the numerical values listed before and after "to" as a lower limit and an upper limit.

In the present specification, in a case where the size of inner cross section of a tube (equivalent diameter) of a flow path, a joining portion, a mixer, or the like is described, this does not include the size of a connection portion of flow paths, a connection portion of a flow path and a joining portion, and a connection portion of a flow path and a mixer. That is, the size of each of the above connection portions is appropriately adjusted using a connecting tube or the like such that a fluid flows in the connection portion from upstream to downstream. For example, assuming that there is a tube a having an equivalent diameter of the inner cross section of 1 mm, and the tube a is connected to a static mixer having an equivalent diameter of the inner cross section of the tube of 5 mm, an equivalent diameter of an inner cross section of a tube of the connection portion of the tube a and the static mixer is larger than 1 mm. However, this embodiment also included in the embodiments of the tube a having an equivalent diameter of 1 mm.

According to the manufacturing method of an embodiment of the present invention, it is possible to obtain a polymer, which has a high molecular weight equal to or greater than a certain value and a highly monodisperse molecular weight distribution, at an excellent monomer conversion rate. Furthermore, in a case where the manufacturing method is performed using the flow-type reaction system according to an embodiment of the present invention, it is possible to obtain a polymer, which has a high molecular weight equal to or greater than a certain value and a highly monodisperse molecular weight distribution, at an excellent monomer conversion rate.

DESCRIPTION OF THE PREFERRED EMBODIMENTS

[Flow-Type Reaction System]

Figure 1:
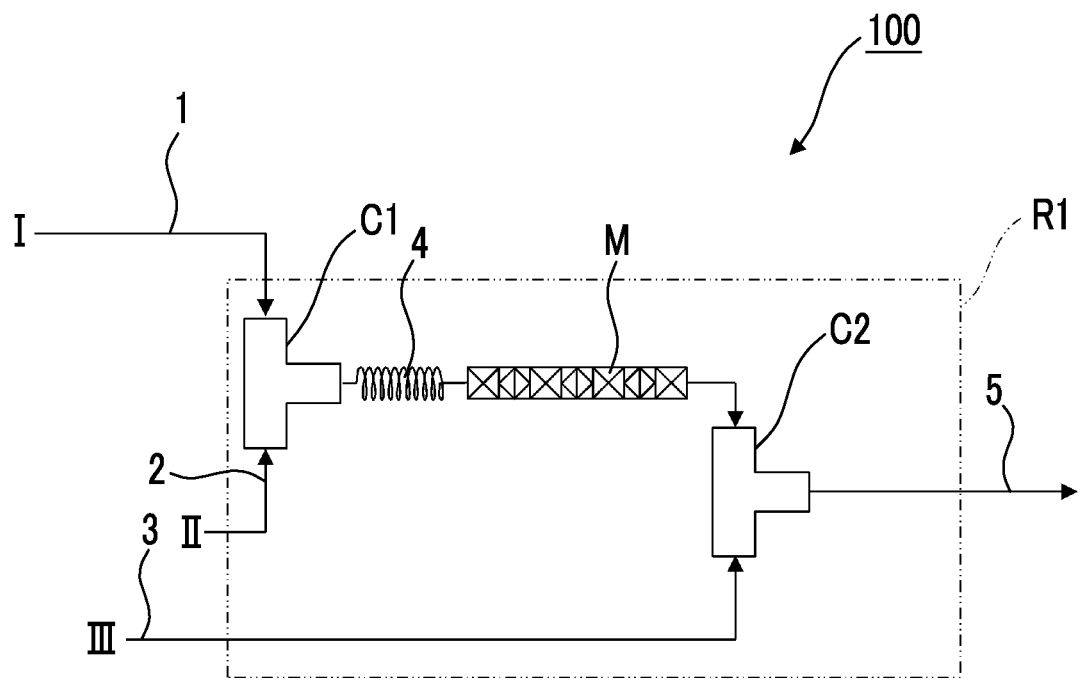
FIG. 1 is a view for schematically illustrating an embodiment of a flow-type reaction system of the present invention.

An embodiment of a flow-type reaction system used in the method for manufacturing a polymer according to an embodiment of the present invention (hereinafter, described as "manufacturing method of the present invention" as well) will be described using drawings. Except for the items specified by the present invention, the present invention is not limited to the aspects shown in the drawings.

FIG. 1 is a schematic view showing an example of the flow-type reaction system used in the manufacturing method of the present invention. A flow-type reaction system (100) shown in FIG. 1 comprises an anionic polymerizable monomer supply flow path (1) comprising an inlet port (I) for introducing a liquid (hereinafter, also referred to as "liquid A") containing an anionic polymerizable monomer, an anionic polymerization initiator supply flow path (2) comprising an inlet port (II) for introducing a liquid (hereinafter, also referred to as "liquid B") containing an anionic polymerization initiator, a polymerization terminator supply flow path (3) comprising an inlet port (III) for introducing a polymerization terminator, a joining portion (C1) where the anionic polymerizable monomer supply flow path (1) and the anionic polymerization initiator supply flow path (2) join together, a reaction tube (4) connected to the end of the downstream side of the joining portion (C1), a joining portion (C2) where the reaction tube (4) and the polymerization terminator supply flow path (3) join together, and a pipe line (5) connected to the end of the downstream side of the joining portion (C2). A static mixer (M), which will be described later, is incorporated into the flow-type reaction system at a specific position of the reaction tube (4).

In the embodiment shown in FIG. 1, at least the joining portion (C1), a region between the joining portion (C1) and the joining portion (C2), the joining portion (C2), and a portion of the pipe line (5) connected to the joining portion (C2) are arranged in a constant-temperature tank (R1). During an anionic polymerization reaction and a polymerization termination reaction, it is preferable to control the temperature such that the liquid temperature becomes $-100°$ C. to $40°$ C. (preferably $-80°$ C. to $30°$ C., and more preferably $-50°$ C. to $20°$ C.).

Usually, a liquid feeding pump (not shown in the drawing) such as a syringe pump is connected to each of the inlet ports (I), (II), and (III). By operating the pump, the liquid A, the liquid B, and the polymerization terminator can flow in each flow path.

In the flow-type reaction system (100) shown in FIG. 1, some or all of the anionic polymerizable monomer supply flow path (1), the anionic polymerization initiator supply flow path (2), the joining portion (C1), the reaction tube (4), the joining portion (C2), and the pipe line (5) may be provided with an individual constant-temperature tank so as to separately control the temperature of a liquid flowing through each of the flow paths, joining portions, and pipe line.

For example, the liquid temperature can be controlled such that the temperature of the liquid flowing in the anionic polymerizable monomer supply flow path (1) and the anionic polymerization initiator supply flow path (2) becomes $0°$ C. to $40°$ C. (preferably $0°$ C. to $30°$ C., more preferably $5°$ C. to $30°$ C., and even more preferably $5°$ C. to $20°$ C.) and the temperature of the liquid flowing in the reaction tube 4 becomes $-80°$ C. to $-5°$ C. (preferably $-80°$ C. to $-10°$ C. and more preferably $-50°$ C. to $-10°$ C.). In this case, it is preferable to control the liquid temperature such that the temperature of the liquid in the joining portion (C1) is the same as the temperature ($0°$ C. to $40°$ C.) of the liquid flowing in the anionic polymerizable monomer supply flow path (1) and the anionic polymerization initiator supply flow path (2) (the temperature is preferably $0°$ C. to $30°$ C., more preferably $5°$ C. to $30°$ C., and even more preferably $5°$ C. to $20°$ C.). In a case where the liquid temperature is controlled as above, even for a monomer having a low polymerization rate, the polymerization reaction can be uniformly accelerated, and the molecular weight dispersity can be further reduced. The temperatures of the liquids flowing in the anionic polymerizable monomer supply flow path (1) and the anionic polymerization initiator supply flow path (2) may be the same as or different from each other, but are preferably the same as each other. Furthermore, in a case where the temperature of the liquid flowing in a certain flow path is adjusted to the temperature range described above (for example, $-80°$ C. to $-5°$ C.), the temperature of the liquid may be varied within the above temperature range (for example, $-80°$ C. to $-5°$ C.) while the liquid is flowing in the flow path.

The temperature can be controlled as above in the embodiment shown in FIG. 2 that will be described later. In this case, the joining portion (C1) is replaced with the joining portion (C3).

In the present specification, "upstream" and "downstream" are used for the direction along which a liquid flows. A side where a liquid is introduced (in FIG. 1, the side of the inlet ports (I), (II), and (III)) is upstream, and a side opposite to the upstream is downstream.

Each configuration of the embodiment shown in FIG. 1 will be more specifically described.

<Anionic Polymerizable Monomer Supply Flow Path (1)>

The anionic polymerizable monomer supply flow path (1) is a flow path for supplying the liquid A introduced from the inlet port (I) to the joining portion (C1). The equivalent diameter of the anionic polymerizable monomer supply flow path (1) is preferably 1 to 10 mm. In a case where the equivalent diameter of the anionic polymerizable monomer supply flow path (1) is equal to or greater than 1 mm, even though the flow rate is increased to some extent, it is possible to inhibit the internal pressure of the system from excessively increasing and to further increase the polymer productivity. In a case where the equivalent diameter of the anionic polymerizable monomer supply flow path (1) is equal to or smaller than 10 mm, the temperature of the liquid can be accurately controlled at a point in time when the liquid is introduced into the joining portion (C1). The equivalent diameter of the anionic polymerizable monomer supply flow path (1) is more preferably 1 to 8 mm, and even more preferably 1 to 6 mm.

"Equivalent diameter" is a term used in the field of mechanical engineering, and is also called equilibrium diameter. Assuming that there is a circular tube equivalent to a pipe line or a flow path having a given inner cross-sectional shape of the tube, the diameter of the inner cross-section of the equivalent circular tube is referred to as equivalent diameter. The equivalent diameter (deq) is defined as $dep=4A/p$ in which A represents an inner cross-sectional area of a pipe line and p represents a wetted perimeter (inner perimeter) of a pipe line. In a case where the above definition is applied to a circular tube, the equivalent diameter equals the diameter of the inner cross section of the circular tube. Based on the data regarding an equivalent circular tube, the equivalent diameter is used for estimating the fluidity or the heat transfer characteristics of the pipe line, and shows the spatial scale (representative length) of a phenomenon. For a square tube in which a represents one side of the inner cross section of the tube, the equivalent diameter $dep=4a^2/4a=a$; for an equilateral triangular tube in which a represents one side thereof, $deq=a/3^{1/2}$; and for a flow between parallel flat plates in which h represents a height of a flow path, deq=2 h (for example, see "Mechanical Engineering Dictionary", edited by The Japan Society of Mechanical Engineers, 1997, Maruzen Co., Ltd).

The length of the anionic polymerizable monomer supply flow path (1) is not particularly limited, and the anionic polymerizable monomer supply flow path (1) can be constituted, for example, with a tube having a length of about 10 cm to 15 m (preferably 30 cm to 10 m).

The material of the tube is not particularly limited, and examples thereof include perfluoroalkoxyalkane (PFA), Teflon (registered trademark), an aromatic polyether ketone-based resin, stainless steel, copper or a copper alloy, nickel or a nickel alloy, titanium or a titanium alloy, quartz glass, soda lime glass, and the like. From the viewpoint of flexibility and chemical resistance, as the material of the tube, PFA, Teflon (registered trademark), stainless steel, a nickel alloy, or titanium is preferable.

The flow rate at which the liquid A is introduced from the inlet port (I) is not particularly limited, and can be appropriately selected according to the purpose in consideration of the equivalent diameter of the flow path, the concentration of the liquid B, the flow rate of the liquid B introduced, and the like. For example, the flow rate is preferably 1 to 4,000 mL/min, more preferably 5 to 3,000 mL/min, and even more preferably 50 to 3,000 mL/min. In a case where the flow rate of the liquid A introduced is within the above range, the mixing efficiency in the joining portion is increased. Therefore, a more monodisperse polymer can be obtained, and the concern about the pressure loss is reduced. The flow rate at which the liquid A is introduced may be 5 to 2,000 mL/min or 10 to 1,000 mL/min. The flow rate and can also be 20 to 800 mL/min or 40 to 600 mL/min.

—Liquid A Containing Anionic Polymerizable Monomer—

The liquid A flowing in the anionic polymerizable monomer supply flow path (1) may be an anionic polymerizable monomer. However, from the viewpoint of melting point, viscosity, and the removal of heat generated by a reaction, generally the liquid A is a solution obtained by dissolving an anionic polymerizable monomer in a solvent. The solvent contained in the liquid A may be appropriately selected according to the type of the monomer to be used. Examples of the solvent include a linear, branched, or cyclic ether solvent, a hydrocarbon solvent, and the like. More specifically, as the ether solvent, it is possible to use tetrahydrofuran, dioxane, trioxane, methyl t-butyl ether, cyclopentyl methyl ether, ethylene glycol dibutyl ether, diethylene glycol dimethyl ether, diethylene glycol diethyl ether, diethylene glycol dibutyl ether, derivatives of these, and the like. As the hydrocarbon solvent, it is possible to use hexane, heptane, octane, cyclohexane, methyl cyclohexane, benzene, toluene, xylene, decalin, tetralin, derivatives of these, and the like. Among these, from the viewpoint of the solubility or the polymerization rate of a monomer, tetrahydrofuran is preferably used.

The anionic polymerizable monomer in the liquid A is not particularly limited, and can be appropriately selected according to the purpose. Examples thereof include a vinyl aromatic hydrocarbon, an acrylic monomer, a methacrylic monomer, a conjugated diene, and the like.

Examples of the vinyl aromatic hydrocarbon include styrene, a styrene derivative (p-dimethylsilylstyrene, (p-vinylphenyl)methylsulfide, p-hexynylstyrene, p-methoxystyrene, p-tert-butyldimethylsiloxystyrene, o-methylstyrene, p-methylstyrene, p-tert-butylstyrene, α-methylstyrene, p-tert-butoxystyrene, p-tert-butoxy-α-methylstyrene, m-tert-butoxystyrene, p-(1-ethoxyethoxy)styrene, or the like), vinyl naphthalene, 2-tert-butoxy-6-vinyl naphthalene, vinyl anthracene, 1,1-diphenylethylene, and the like.

Examples of the acrylic monomer include methyl acrylate, ethyl acrylate, isopropyl acrylate, isobutyl acrylate, tert-butyl acrylate, cyclohexyl acrylate, benzyl acrylate, epoxy acrylate, ethylene glycol diacrylate, diethylene glycol diacrylate, trimethylolpropane triacrylate, and tetramethylene glycol tetraacrylate, 2-hydroxy-1,3-diacryloxypropane, 2,2-bis[4-(acryloxymethoxy)phenyl]propane, 2,2-bis[4-(acryloxyethoxy)phenyl]propane, dicyclopentenyl acrylate, tricyclodecanyl acrylate, tris(acryloxyethyl) isocyanurate, urethane acrylate, and the like.

Furthermore, examples of the methacrylic monomer include monomers having a structure obtained by substituting an acryloyl group of the monomers exemplified as the above acrylic monomer with a methacryloyl group.

Examples of the conjugated diene include 1,3-butadiene, 2-methyl-1,3-butadiene, 2,3-dimethyl-1,3-butadiene, 1,3-pentadiene, 1,3-hexadiene, 1,3-cyclohexadiene, and the like.

One of the above monomers may be used singly, or two or more monomers among the above monomers may be used in combination.

The content of the anionic polymerizable monomer in the liquid A is not particularly limited, and is appropriated adjusted in consideration of the concentration of an initiator in the liquid B, the flow rate of the liquid B introduced, the desired molecular weight of the polymer, and the like. The content of the anionic polymerizable monomer in the liquid A can be 1% to 100% by mass for example, and is preferably 3% to 70% by mass, more preferably 5% to 50% by mass, and still more preferably 10% to 40% by mass.

From the viewpoint of viscosity and the removal of heat generated by a reaction, the molar concentration of the anionic polymerizable monomer in the liquid A is preferably 0.5 to 10 M, and more preferably 0.5 to 5 M.

<Anionic Polymerization Initiator Supply Flow Path (2)>

The anionic polymerization initiator supply flow path (2) is a flow path for supplying the liquid B introduced from the inlet port (II) to the Joining portion (C1). The equivalent diameter of the anionic polymerization initiator supply flow path (2) is preferably 1 to 10 mm. In a case where the equivalent diameter of the anionic polymerization initiator supply flow path (2) is equal to or greater than 1 mm, even though the flow rate is increased to some extent, it is possible to inhibit the internal pressure of the system from excessively increasing and to further increase the polymer productivity. In a case where the equivalent diameter of the anionic polymerization initiator supply flow path (2) is equal to or smaller than 10 mm, the temperature of the liquid can be appropriately controlled at a point in time when the liquid is introduced into the joining portion (C1). The equivalent diameter of the anionic polymerization initiator supply flow path (2) is more preferably 1 to 8 mm, and even more preferably 1 to 6 mm.

The length of the anionic polymerization initiator supply flow path (2) is not particularly limited, and the anionic polymerization initiator supply flow path (2) can be constituted, for example, with a tube having a length of about 10 cm to 15 m (preferably 30 cm to 10 m).

The material of the tube is not particularly limited. As the tube, it is possible to use a tube formed of a material exemplified above for the anionic polymerizable monomer supply flow path (1).

The flow rate at which the liquid B is introduced from the inlet port (II) is preferably higher than 10 mL/min and equal to or lower than 2,000 mL/min. In a case where the flow rate of the liquid B is within the above range, the mixing efficiency in the joining portion is increased. Therefore, a more monodisperse polymer can be obtained, and the concern about the pressure loss is reduced. The flow rate of the liquid B introduced is preferably 11 to 2,000 mL/min. Furthermore, the flow rate of the liquid B introduced may be 12 to 1,000 mL/min or 12 to 600 mL/min, and can be 12 to 300 mL/min.

From the viewpoint of controlling the molecular weight of the polymer, a flow rate B at which the liquid B is introduced from the inlet port (II) is preferably lower than a flow rate A at which the liquid A is introduced from the inlet port (I). The ratio between the flow rate A and the flow rate B represented by [flow rate A]/[flow rate B] is preferably 20/1 to 1.2/1, and more preferably 10/1 to 1.3/1. In the present specification, the unit of a flow rate is mL/min (minute).

—Liquid B Containing Anionic Polymerization Initiator—

The liquid B flowing in the anionic polymerization initiator supply flow path (2) may be an anionic polymerization initiator. However, from the viewpoint of viscosity and safety, generally, the liquid B is a solution obtained by dissolving an anionic polymerization initiator in a solvent. The solvent contained in the liquid B may be appropriately selected according to the type of the initiator to be used. Examples thereof include a linear, branched, or cyclic hydrocarbon solvent and the like. More specifically, examples thereof include hexane, heptane, octane, cyclohexane, methyl cyclohexane benzene, toluene, xylene, decalin, tetralin, derivatives of these, and the like.

Particularly, it is preferable that the solvent used in liquid B contains an aromatic hydrocarbon. As the aromatic hydrocarbon, for example, toluene and xylene are preferable. Among these, toluene is preferably used. In a case where an aromatic hydrocarbon is used as the solvent, a monomer conversion rate is further increased, and hence the polymerization rate can be further increased. Particularly, in a case where toluene is used, a monomer conversion rate can be significantly increased, which is advantageous particularly for manufacturing a polymer having a high molecular weight.

—Anionic Polymerization Initiator—

The anionic polymerization initiator used in the liquid B is not particularly limited, and a wide variety of initiators used in general anionic polymerization can be used. The anionic polymerization initiator is appropriately selected according to the type of the monomer to be used.

In a case where the method of the polymerization described above is anionic polymerization which is a living polymerization method, examples of the polymerization initiator include an organic lithium compound and an organic magnesium compound.

The organic lithium compound is not particularly limited, and can be appropriately selected from conventionally known organic lithium compounds. Examples thereof include alkyl lithium such as methyl lithium, ethyl lithium, propyl lithium, butyl lithium (n-butyllithium, sec-butyllithium, iso-butyllithium, tert-butyllithium, or the like), pentyl lithium, hexyl lithium, methoxymethyl lithium, or ethoxymethyl lithium; benzyl lithium such as α-methylstyryllithium, 1,1-diphenyl-3-methylpentryllithium, or 3-methyl-1,1-diphenylpentyllithium; alkenyl lithium such as vinyl lithium, allyl lithium, propenyl lithium, or butenyl lithium, alkynyl lithium such as ethynyl lithium, butynyl lithium, pentynyl lithium, or hexynyl lithium; aralkyl lithium such as benzyl lithium or phenyl ethyl lithium; aryl lithium such as phenyl lithium or naphthyl lithium; hetero- cyclic lithium such as 2-thienyllithium, 4-pyridyllithium, or 2-quinolyllithium; an alkyl lithium-magnesium complex such as tri(n-butyl)magnesium lithium or trimethyl magnesium lithium, and the like. Among these, alkyl lithium is more preferable, and n-butyllithium is particularly preferable, because these compounds have high reactivity and can cause an initiation reaction at a high speed. Among butyl lithium compounds, n-butyllithium is preferable because, for example, this compound exhibits high stability in a solution state. For example, in a case where sec-butyllithium is used, this compound is gradually precipitated in a suspension state without being dissolved, which leads to a concern that the quality stability in the industrial production of a polymer may become problematic. Furthermore, tert-butyllithium is not suitable for industrial production because this compound is extremely flammable and ignitable. One of the above organic lithium compounds may be used singly, or two or more compounds among the above organic lithium compounds may be used in combination.

Examples of the organic magnesium compound include di-n-butylmagnesium, di-tert-butylmagnesium, di-sec-butylmagnesium, n-butyl-sec-butylmagnesium, n-butyl-ethylmagnesium, di-n-amylmagnesium, dibenzyl magnesium, diphenyl magnesium, and the like.

The content of the anionic polymerization initiator in the liquid B is not particularly limited, and is appropriated adjusted in consideration of the concentration of the monomer in the liquid A, the flow rate of the liquid A introduced, the desired molecular weight of the polymer, and the like. The content of the anionic polymerization initiator in the liquid B is generally 0.01% to 20% by mass, more preferably 0.01% to 15% by mass, even more preferably 0.01% to 10% by mass, and still more preferably 0.05% to 10% by mass.

From the viewpoint of controlling the molecular weight of a polymer, the molar concentration of the anionic polymerization initiator in the liquid B is preferably 0.004 to 1.6 M, more preferably 0.008 to 1.6 M, and even more preferably 0.008 to 0.8 M.

Regarding the amount of the liquid A and the liquid B introduced, in a case where the liquid A and the liquid B are assumed to be homogeneously mixed together in the joining portion (C1), a ratio of equivalent of anionic polymerization initiator:equivalent of anionic polymerizable monomer in the mixed solution is preferably 1:5 to 1:5,000, more preferably 1:10 to 1:5,000, and particularly preferably 1:10 to 1:1,000. The equivalent ratio that is within the particularly preferred range described above is advantageous, because in this range, it is possible to obtain a polymer having a molecular weight that is substantially equal to a theoretical molecular weight. That is, in a case where the monomer is a compound having one polymerizable functional group, the amount of the monomer used with respect to 1 mol of the initiator is preferably 5 to 5,000 mol, more preferably 10 to 5,000 mol, and particularly preferably 10 to 1,000 mol.

<Joining Portion (C1)>

The liquid A flowing in the anionic polymerizable monomer supply flow path (1) and the liquid B flowing in the anionic polymerization initiator supply flow path (2) join together in the joining portion (C1). The joining portion (C1) is not particularly limited as long as this portion functions as a mixer, can allow the anionic polymerizable monomer supply flow path (1) and the anionic polymerization initiator supply flow path (2) to join together to form a single flow path, and can send a solution obtained by the joining to the reaction tube (4) connected to the end of the downstream side of the joining portion (C1). In the embodiment shown in FIG. 1, a T-shaped connector is used as the joining portion (C1).

The equivalent diameter of the flow path in the joining portion (C1) is preferably 0.2 to 10 mm from the viewpoint of further improving the mixing performance, and more preferably 1 to 5 mm from the viewpoint of further inhibiting pressure loss.

The material of the joining portion (C1) is not particularly limited. For example, it is possible to use the joining portion (C1) consisting of materials such as perfluoroalkoxyalkane (PFA), Teflon (registered trademark), an aromatic polyether ketone-based resin, stainless steel, copper or a copper alloy, nickel or a nickel alloy, titanium or a titanium alloy, quartz glass, and soda lime glass.

As the joining portion (C1), a commercially available mixer can be used. Examples thereof include MICRO-GLASS REACTOR manufactured by Micro Glass Co., Ltd.; CYTOS manufactured by CPC Systems, Ltd.; YM-1 and YM-2 mixers manufactured by Yamatake Co., Ltd.; MIXING TEE &TEE manufactured by Shimadzu GLC Ltd. (T-shaped connector); MIXING TEE & TEE manufactured by GL Sciences (T-shaped connector); MIXING TEE & TEE manufactured by Upchurch Scientific (T-shaped connector); MIXING TEE & TEE manufactured by Valco Instruments Co., Inc. (T-shaped connector); a T-shaped cross connector manufactured by Swagelok Company, and the like. All of these can be used in the present invention.

<Reaction Tube (4)>

The liquid A and the liquid B join together and are mixed together in the joining portion (C1), and then flow into the reaction tube (4) which is a reaction flow path. While the mixed solution is flowing to downstream in the reaction tube (4), the anionic polymerizable monomer undergoes anionic polymerization.

The form of the reaction tube (4) is not particularly limited. Generally, a tube is used as the reaction tube (4). The material preferred for the reaction tube (4) is the same as the material preferred for the anionic polymerizable monomer supply flow path (1) described above. The reaction time required for the anionic polymerization can be adjusted according to the equivalent diameter and the length of the reaction tube (4), the setting of the flow rate of a liquid feeding pump, and the like. The retention time of a reaction solution flowing in the reaction tube (4) may be appropriately adjusted according to the molecular weight of the desired polymer. Generally, the equivalent diameter of the reaction tube (4) is 0.1 to 50 mm, more preferably 0.2 to 20 mm, even more preferably 0.4 to 15 mm, still more preferably 0.7 to 10 mm, and yet more preferably 1 to 5 mm. Furthermore, the length of the reaction tube (4) including the static mixer, which will be described later, is preferably 3 to 100 m, and more preferably 5 to 100 m.

A static mixer (M) is incorporated into a specific position of the reaction tube. The static mixer is a stationary mixer without a driving portion, which stirs and mixes together fluids introduced into the mixer while sequentially repeating division, rejoining, and direction changing by using a stationary mixing element installed in the mixer. Examples of the static mixer include the Sulzer static mixer, the Kenics static mixer, Toray's static mixers, static mixers from NORITAKE CO., LIMITED, and the like. The static mixer preferably has 4 or more mixing elements, and more preferably has 6 to 30 mixing elements. It is preferable that these mixing elements are arranged consecutively in a mixer tube having a length of 10 cm to 2 m. Furthermore, it is possible to adopt an embodiment in which a plurality of static mixers described above are arranged in series. In this case, all of the plurality of static mixers arranged in series form a single unit, which is the static mixer in the present invention.

In the present invention, at an inlet port of the static mixer incorporated into the reaction tube, the number-average molecular weight of the polymer in the polymerization reaction solution is equal to or greater than 2,000. That is, a polymer solution having a number-average molecular weight equal to or greater than 2,000 is introduced into the static mixer and stirred and mixed while flowing in the mixer, such that the polymerization reaction proceeds to finally produce a polymer having a number-average molecular weight of 5,000 to 200,000. The number-average molecular weight of the polymer in the polymerization reaction solution at the inlet port of the static mixer can be appropriately set according to the molecular weight of the polymer to be finally obtained. For example, the number-average molecular weight can be 2,000 to 150,000, and is preferably 3,000 to 120,000 and more preferably 4,000 to 100,000.

The number-average molecular weight of the polymer obtained by the manufacturing method according to an embodiment of the present invention can be 5,000 to 170,000, and is preferably 5,000 to 150,000 or 5,000 to 120,000.

In the present invention, at the inlet port of the static mixer incorporated into the reaction tube, a monomer conversion rate is preferably equal to or higher than 1.0%. The monomer conversion rate at the inlet port of the static mixer is more preferably equal to or higher than 2.0%, more preferably equal to or higher than 5.0%, even more preferably equal to or higher than 10%, still more preferably equal to or higher than 15%, and particularly preferably equal to or higher than 20%. In a case where the static mixer is disposed as described above, it is possible to more effectively obtain a polymer, which has a high molecular weight equal to or greater than a certain value and a highly monodisperse molecular weight distribution, at an excellent monomer conversion rate. The monomer conversion rate at the inlet port of the static mixer is usually equal to or lower than 97%, and more preferably equal to or lower than 96%. In addition, the monomer conversion rate at the inlet port of the static mixer may be equal to or lower than 90%, equal to or lower than 80%, or equal to or lower than 70%, and is preferably equal to or lower than 60%.

The size of the static mixer used in the present invention is appropriately set according to the manufacturing scale and the like. For example, an inner equivalent diameter of the tube of the static mixer can be 2 to 100 mm, and is more preferably 2 to 60 mm. The inner equivalent diameter of the tube of the static mixer may be 2 to 50 mm, 2 to 40 mm, or 2 to 30 mm, and can be 2 to 20 mm. Even though the inner cross section of the tube of the static mixer is larger than the inner cross section of the reaction tube 4, the reaction tube 4 and the static mixer can be connected through a tube or the like capable of connecting the reaction tube and the static mixer.

The length of the static mixer can be about 10 cm to 20 m, is preferably 20 cm to 20 m, and may be 20 cm to 10 m, 20 cm to 5 m, or 20 cm to 4 m. In a case where a plurality of static mixers are arranged in series, the aforementioned length is the total length of the plurality of static mixers arranged in series (including the distance between the static mixers). In addition, in a case where a plurality of static mixers are arranged in series, the distance between adjacent static mixers can be appropriately set in consideration of the difference between the size of inner cross section of the tube of a static mixer and the size of inner cross section of the tube of the reaction flow path connected to the static mixer, and the like. The distance between adjacent static mixers can be, for example, equal to or shorter than 100 cm, equal to or shorter than 70 cm, equal to or shorter than 40 cm, equal to or shorter than 20 cm, or equal to or shorter than 10 cm. Furthermore, the distance between adjacent static mixers is preferably equal to or shorter than [equivalent diameter of inner cross section of tube of static mixer×50], and more preferably equal to or shorter than [equivalent diameter of inner cross section of tube of static mixer×20]. The distance is also preferably equal to or shorter than [equivalent diameter of inner cross section of tube of static mixer×10].

The material of the static mixer is not particularly limited, and examples thereof include perfluoroalkoxyalkane (PFA), Teflon (registered trademark), an aromatic polyether ketone-based resin, stainless steel, copper or a copper alloy, nickel or a nickel alloy, titanium or a titanium alloy, quartz glass, soda lime glass, and the like. From the viewpoint of flexibility, chemical resistance, and the like, PFA, Teflon, stainless steel, a nickel alloy, or titanium is preferable.

<Polymerization Terminator Supply Flow Path (3)>

The polymerization terminator supply flow path (3) is a flow path for supplying a polymerization terminator introduced from the inlet port (III) to the joining portion (C2). The equivalent diameter of the polymerization terminator supply flow path (3) is more preferably 1 to 10 mm, even more preferably 1 to 8 mm, and still more preferably 1 to 6 mm. The length of the polymerization terminator supply flow path (3) is not particularly limited. For example, polymerization terminator supply flow path (3) can be constituted with a tube having a length of about 10 cm to 15 m (preferably 30 cm to 10 m). The material preferred for the polymerization terminator supply flow path (3) is the same as the material preferred for the anionic polymerizable monomer supply flow path (1) described above.

—Polymerization Terminator—

The polymerization terminator is not particularly limited as long as it is a liquid containing a component (polymerization termination component) deactivating anions which are active species. Examples of the polymerization terminator include an aqueous solution or an organic solution containing an alcohol and/or an acidic substance as a polymerization termination component (for example, a solution containing tetrahydrofuran (THF), methyl t-butyl ether, dioxane, cyclopentyl methyl ether, toluene, or the like as a solvent). Furthermore, as a polymerization terminator, it is also possible to use a liquid containing an electrophile such as a halogenated alkyl or chlorosilane as a polymerization termination component.

Examples of the alcohol as a polymerization termination component include methanol, ethanol, propanol, isopropyl alcohol, and the like.

Examples of the acidic substance as a polymerization termination component include acetic acid, hydrochloric acid, and the like.

Examples of halogenated alkyl as a polymerization termination component include alkyl fluoride, alkyl iodide, and the like.

In the mixed solution joined with the polymer solution, the amount of the polymerization termination components such as an alcohol, an acidic substance, and an electrophile contained in the polymerization terminator is preferably 1 to 100 mol with respect to 1 mol of the polymerization initiator.

The flow rate at which the polymerization terminator is introduced from the inlet port (III) is not particularly limited, and can be appropriately selected according to the purpose. For example, the flow rate can be set to 1 to 3,000 mL/min. The flow rate is more preferably 2 to 2,000 mL/min, and even more preferably 4 to 2,000 mL/min. In a case where the flow rate is within the above range, solutions can be rapidly mixed together, and the concerns about the pressure loss is reduced. The flow rate at which the polymerization terminator is introduced may be 5 to 2,000 mL/min or 10 to 1,000 mL/min. The flow rate can be 20 to 800 mL/min or 40 to 600 mL/min.

<Joining Portion (C2)>

The polymerization reaction solution that has undergone anionic polymerization reaction while flowing in the reaction tube (4) and the polymerization terminator that flows in the polymerization terminator supply flow path (3) join together in the joining portion (C2). The joining portion (C2) is not particularly limited as long as this portion functions as a mixer and allows the reaction tube (4) and the polymerization terminator supply flow path (3) to join together to form a single flow path, and can send the solution formed by the joining to the pipe line (5) of downstream. In the embodiment shown in FIG. 1, a T-shaped connector is used as the joining portion (C2).

The equivalent diameter of the flow path in the joining portion (C2) is preferably 0.2 to 10 mm from the viewpoint of further improving the mixing performance, and more preferably 1 to 10 mm from the viewpoint of further inhibiting pressure loss.

The material of the joining portion (C2) is not particularly limited, and it is possible to use a substance consisting of the same materials as those described above regarding the joining portion (C1). Furthermore, specific examples of mixers that can be adopted as the joining portion (C2) are the same as the specific examples of mixers that can be adopted as the joining portion (C1).

<Pipe Line (5)>

While flowing in the pipe line (5), the mixed solution containing the polymerization reaction solution and the polymerization terminator have a reaction, the anions are deactivated, and accordingly, polymerization is terminated.

The pipe line (5) can be constituted with a tube. From the viewpoint of more precisely controlling the liquid temperature of the liquid flowing in the pipe line (5), the equivalent diameter of the pipe line (5) is preferably 1 to 50 mm, and more preferably 1 to 10 mm. The length of the pipe line (5) may be appropriately adjusted according to the equivalent diameter, the flow rate, and the molecular weight of the desired polymer. The length of the pipe line (5) is preferably 1 to 20 m, and more preferably 2 to 10 m. The material preferred for the pipe line (5) is the same as the material preferred for the anionic polymerizable monomer supply flow path (1) described above.

The liquid temperature of the liquid flowing in the pipe line (5) is not particularly limited. However, as shown in FIG. 1, it is preferable that at least the temperature of the upstream side of the liquid is the same as the temperature of the liquid flowing in the reaction tube (4).

The flow rate of the liquid flowing in the pipe line (5) equals the sum of the flow rate of the liquid flowing in the polymerization terminator supply flow path (3) and the flow rate of the liquid flowing in the reaction tube (4).

In a case where a liquid is collected at the downstream of the pipe line (5), the desired polymer can be obtained.

Another embodiment of the flow-type reaction system for performing the manufacturing method according to an embodiment of the present invention will be described using FIG. 2. The embodiment shown FIG. 2 is the same as the embodiment shown FIG. 1, except that the anionic polymerizable monomer supply flow path (1) branches off into two flow paths in the middle of the flow path (1). Preferred embodiments (preferred embodiments of flow rate, temperature control, and the like) are also the same for the reaction systems shown in FIGS. 1 and 2. In the embodiment shown in FIG. 2, the anionic polymerizable monomer supply flow path (1) branches off into two flow paths in the middle of the flow path (1). The two flow paths branched off from the flow path (1) are introduced into the joining portion (C3), which is a cross connector, through connection ports facing each other and join together. In this embodiment, the anionic polymerization initiator supply flow path (2), through which the liquid B flows, is connected to a connection port of the joining portion (C3) that faces a site of the joining portion (C3) connected to the reaction tube (4). In a case where the anionic polymerizable monomer supply flow path (1) branches off as described above, the monomer and the initiator are more rapidly and more homogeneously mixed together in the joining portion (C3). Accordingly, the molecular weight distribution of the obtained polymer can be further narrowed, and a highly monodisperse polymer can be obtained. The inner diameter of the cross connector is preferably 1 to 10 mm.

A wide variety of commercially available products can be widely used as the cross connector. For example, as the commercially available products, it is possible to use a cross connector manufactured by Upchurch Scientific; UNION CROSS manufactured by Swagelok Company; a 4-way joint manufactured by EYELA, and the like.

Figure 2:
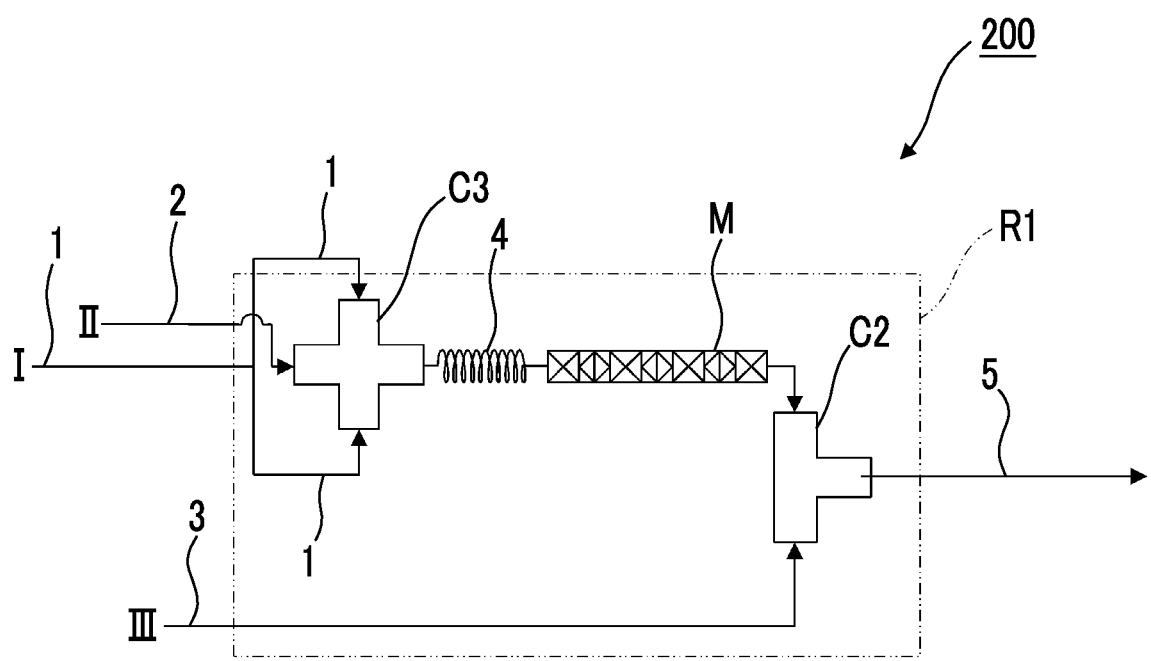
FIG. 2 is a view for schematically illustrating another embodiment of a flow-type reaction system of the present invention.

In the embodiment shown in FIG. 2, the anionic polymerizable monomer supply flow path (1) branches off into two flow paths. However, the flow path (1) may branches off into three or more flow paths, and this embodiment is also preferable as an embodiment of the present invention. In addition, an embodiment may also be adopted in which the anionic polymerization initiator supply flow path (2) branches off with or without branching off the anionic polymerizable monomer supply flow path (1) and the flow paths (1) and (2) join together in a joining portion. This embodiment is also included in the embodiments of the present invention. Particularly, it is preferable to adopt an embodiment in which the anionic polymerizable monomer supply flow path (1) branches off into two or more flow paths and the anionic polymerization initiator supply flow path (2) does not branch off or branches off into two or more flow paths. The relationship between the number of branches of the anionic polymerizable monomer supply flow path (1) and the number of branches of the anionic polymerization initiator supply flow path (2) is more preferably set as in the following embodiment i) or ii).

i) Embodiment in which the anionic polymerizable monomer supply flow path (1) has two branches while the anionic polymerization initiator supply flow path (2) has no branch.

ii) Embodiment in which the anionic polymerizable monomer supply flow path (1) has three or more branches, the anionic polymerization initiator supply flow path (2) has two or more branches, and the number of branches of the anionic polymerizable monomer supply flow path (1) is larger than the number of branches of the anionic polymerization initiator supply flow path (2).

In a case where the anionic polymerizable monomer supply flow path (1) branches off, the flow rate of the liquid A described above means a flow rate in the flow path not yet branching off (that is, the total flow rate of flow paths (1) branched off from the original flow path (1)). Likewise, in a case where the anionic polymerization initiator supply flow path (2) branches off, the flow rate of the liquid B described above means a flow rate in the flow path not yet branching off (that is, the total flow rate of flow paths (2) branched off from the original flow path (2)).

The total number of flow paths, which are connected to the joining portion of the liquid A and the liquid B and through which the liquid A flows, and flow paths, which are connected to the joining portion of the liquid A and the liquid B and through which the liquid B flows, is preferably 3 to 10, more preferably 3 to 8, even more preferably 3 to 6, and still more preferably 3 to 5. In this case, it is preferable that the number of branches of the anionic polymerizable monomer supply flow path (1) is larger than the number of branches of anionic polymerization initiator supply flow path (2).

The joining portion, to which the above number of flow paths can be connected, can be constituted with a connector having as many connection ports as the number of flow paths to be connected thereto. For example, in a case where a 6-way connector is used, the total number of flow paths through which the liquid A flows and flow paths through which the liquid B flows can be set to 5, the remaining one connection port can be used as an outlet, and the reaction tube can be connected to the outlet.

As the connector having 5 or more connection ports that is usable in the present invention, a wide variety of commercially available products can be used. Examples of the commercially available products include a 6-way joint manufactured by EYELA, a 6-port joint manufactured by Sugiyama Shoji, a 6-port manifold manufactured by Upchurch Scientific, and the like.

The connector having 5 or more connection ports preferably has an inner diameter of 1 to 10 mm.

Hitherto, an embodiment has been described in which the flow path having branches has one inlet port and branches off in the middle of the flow path. However, an embodiment may also be adopted in which a plurality of inlet ports are provided for one solution, and this embodiment is also included in the embodiments of the present invention. For example, it is possible to adopt an embodiment in which a plurality of anionic polymerizable monomer supply flow paths (1) are prepared and the plurality of anionic polymerizable monomer supply flow paths (1) are caused to join together in a joining portion. This embodiment is also applied to the anionic polymerization initiator supply flow path (2).

In the embodiments shown in FIGS. 1 and 2, the retention time (reaction time) is preferably equal to or longer than 15 seconds, more preferably 20 to 1,800 seconds, and even more preferably 20 to 600 seconds. The retention time (reaction time) in the embodiments shown in FIGS. 1 and 2 means the time taken for the mixed solution of the liquid A and the liquid B to be discharged from the outlet of a pipe line (5) after being introduced into the reaction tube (4).

According to the method for manufacturing a polymer of an embodiment of the present invention, it is possible to obtain a polymer, which has a high molecular weight in a certain range and a highly monodisperse molecular weight distribution, at an excellent monomer conversion rate.

The present invention has been described together with preferred embodiments thereof. However, the present invention is not limited to the above embodiments except for the matters specified by the present invention. Regarding the above embodiments, the present invention provides, for example, a method for manufacturing a polymer and a flow-type reaction system described below.

A method for manufacturing a polymer in which anionic polymerization reaction is performed by a flow-type reaction, the method including introducing a liquid A containing an anionic polymerizable monomer, a liquid B containing an anionic polymerization initiator, and a polymerization terminator into different flow paths, allowing the liquids to flow in the flow paths, allowing the liquid A and the liquid B to join together, subjecting the anionic polymerizable monomer to anionic polymerization while the liquids having joined together are flowing to downstream in a reaction flow path, and allowing a solution, which is obtained by the polymerization reaction and flows in the reaction flow path, and the polymerization terminator to join together so as to terminate the polymerization reaction and to obtain a polymer having a number-average molecular weight of 5,000 to 200,000, in which a static mixer is disposed in the reaction flow path, a polymer having a number-average molecular weight equal to or greater than 2,000 is introduced into an inlet port of the static mixer, a temperature of the liquid A and the liquid B is set to 0° C. to 40° C., and a temperature of a solution (polymerization reaction solution) obtained by joining of the liquid A and the liquid B flowing in the reaction flow path is set to −80 to −5° C.

A flow-type reaction system for manufacturing a polymer by an anionic polymerization reaction, the flow-type reaction system having a first flow path through which an anionic polymerizable monomer flows, a second flow path through which an anionic polymerization initiator flows, a third flow path through which a polymerization terminator flows, a first joining portion where the first flow path and the second flow path join together, a reaction tube connected to downstream of the first joining portion, a second joining portion where the reaction tube and the third flow path join together, and a pipe line connected to downstream of the second joining portion, in which a static mixer is disposed in the reaction tube, a polymer having a number-average molecular weight equal to or greater than 2,000 is introduced into an inlet port of the static mixer, a polymer having a number-average molecular weight of 5000 to 200,000 is obtained from the pipe line, a temperature of the first flow path and the second flow path is set to 0° C. to 40° C., and a temperature of the reaction tube is set to −80° C. to −5° C.

In the flow-type reaction system, the temperature of the first joining portion can also be set to 0° C. to 40° C.

Hereinafter, the present invention will be more specifically described based on examples, but the present invention is not limited to the examples.

EXAMPLES

Example 1

By using the flow-type reaction system 200 constituted as shown in FIG. 2, a polymer was synthesized by an anionic polymerization reaction. Details of each portion are as below.

Liquid Feeding Pump (not Shown in Drawing):

As all of the liquid feeding pumps, PU716B and PU718 manufactured by GL Sciences were used. On the side of flow rate outlet of the pumps, a pulse damper HPD-1, a backpressure valve (44-2361-24) manufactured by TESCOM, and a relief valve RHA (4 MPa) manufactured by IBS COMPANY are sequentially installed.

Low-Temperature Constant-Temperature Tank (R1):

A tabletop small low-temperature water bath CBi-270A manufactured by AS ONE Corporation was used. The temperature thereof was set to −10° C.

Anionic Polymerizable Monomer Supply Flow Path (1):

The flow path (1) had a structure established by dividing a single SUS tube into two parts by using a T-shaped connector.

More specifically, a T-connector (U-429, inner diameter: 1.0 mm) manufactured by Upchurch Scientific was connected to an SUS316 tube having an outer diameter of 1/16 inch, an inner diameter of 1.0 mm, and a length of 10 m. Furthermore, two SUS 316 tubes each having an outer diameter of 1/16 inch, an inner diameter of 1.0 mm, and a length of 5 cm were connected to the T-connector such that the tubes faced each other, thereby preparing the anionic polymerizable monomer supply flow path (1).

Anionic Polymerization Initiator Supply Flow Path (2):

An SUS316 tube was used which has an outer diameter of 1/16 inches, an inner diameter of 1.0 mm, and a length of 10 m.

Joining portion (C3) (cross connector):

A cross connector (U-431, inner diameter: 1.0 mm) manufactured by Upchurch Scientific was used.

The two SUS316 tubes, which were connected to the T-shaped connector constituting the anionic polymerizable monomer supply flow path (1) so as to face each other, were connected to two connection ports facing each other among four connection ports of the aforementioned cross connector. One of the two other connection ports was connected to the anionic polymerization initiator supply flow path (2), and the other connection port was used as an outlet for discharging a liquid (connection port for the reaction tube (4)).

Reaction Tube (4):

From the upstream side to the downstream side, (i) SUS316 tube having an outer diameter of 1/8 inch, an inner diameter of 2.17 mm, and a length of 12 m and (ii) three static mixers (manufactured by NORITAKE CO., LIMITED, diameter of inner cross section of the tube: 6 mm, length: 34 cm, 27-stage mixing element) arranged in series were connected in this order. The three static mixers were connected using an SUS316 tube having an outer diameter of 1/8 inch, an inner diameter of 2.17 mm, and a length of 3 cm.

Polymerization Terminator Supply Flow Path (3):

An SUS316 tube was used which has an outer diameter of 1/8 inches, an inner diameter of 2.17 mm, and a length of 10 m.

Joining Portion (C2) (T-Shaped Connector):

A T-connector (U-429, inner diameter: 1.0 mm) manufactured by Upchurch Scientific was used.

The reaction tube (4) and the polymerization terminator supply flow path (3) were connected to two connection ports facing each other among three connection ports of the T-connector. The remaining connection port was used as an outlet for discharging a liquid (connection port for the pipe line (5)).

Pipe Line (5):

From the upstream side to the downstream side, (i) SUS316 tube having an outer diameter of 1/8 inch, an inner diameter 2.17 mm, and a length 2.5 m, (ii) backpressure valve (manufactured by TESCOM, 44-2361-24), and (iii) Teflon tube having an outer diameter of 1/8 inch, an inner diameter of 2.17 mm, and a length of 0.5 m were connected in this order.

Monomer-Containing Liquid A to be Introduced into Anionic Polymerizable Monomer Supply Flow Path (1):

<Styrene/Tetrahydrofuran (THF)>

THF (deoxidation grade) manufactured by Wako Pure Chemical Industries, Ltd. and styrene (special grade) manufactured by Wako Pure Chemical Industries, Ltd. were added to a 5 L SUS tank, thereby preparing 4 L of a 2 M-styrene/THF solution. This solution was dehydrated using a molecular sieve 3 A, thereby obtaining a liquid A.

In the present example, the description of "xM-y/z" means a solution obtained by dissolving y in a solvent z, in which the concentration of y in the solution is xM.

Initiator-Containing Liquid B to be Introduced into Anionic Polymerization Initiator Supply Flow Path (2):

<n-Butyllithium (nBuLi)/Toluene>

Toluene (deoxidation grade) manufactured by Wako Pure Chemical Industries, Ltd. was added to a 5 L SUS tank and cooled to 0° C. nBuLi (1.6 M-nBuLi/hexane solution) manufactured by KANTO KAGAKU was added thereto, and titrated using menthol/bipyridine, thereby preparing 4 L of a 0.008 M-nBuLi/toluene solution. The solution was adopted as a liquid B.

Polymerization Terminator to be Introduced into Polymerization Terminator Supply Flow Path (3):

<Methanol (MeOH)/THF>

THF (deoxidation grade) manufactured by Wako Pure Chemical Industries, Ltd. and MeOH (deoxidation grade) manufactured by Wako Pure Chemical Industries, Ltd., were added to a 3 L SUS tank, thereby obtaining 4 L of a 0.5 M-MeOH/THF solution. The obtained solution was used as a polymerization terminator.

Liquid Feeding Condition:

Liquid A (2M-styrene/THF): 150 mL/min

Liquid B (0.008 M-nBuLi/toluene): 57 mL/min

Polymerization terminator (0.5 M-MeOH/THF): 90 mL/min

Extraction:

From the outlet of the pipe line (5), 10 mL of a solution containing a polymer was collected, and the molecular weight and the molecular weight distribution of the polymer were measured by gel permeation chromatography (GPC). As a result, the number-average molecular weight (Mn) was 68,000, and the molecular weight distribution (dispersity, Mw/Mn) was 1.05. The monomer conversion rate was 100%.

In the present specification, GPC was performed under the following condition.

Device: HLC-8220GPC (manufactured by Tosoh Corporation)

Detector: differential refractometer (Refractive Index (RI) detector)

Pre-column: TSK GUARD COLUMN HXL-L 6 mm×40 mm (manufactured by Tosoh Corporation)

Sample side column: the following three columns connected in series in the following order (manufactured by Tosoh Corporation)

TSK-GEL GMHXL 7.8 mm×300 mm

TSK-GEL G4000HXL 7.8 mm×300 mm

TSK-GEL G2000HXL 7.8 mm×300 mm

Reference side column: TSK-GEL G1000HXL 7.8 mm×300 mm

Temperature of constant-temperature tank: 40° C.

Mobile layer: THF

Flow rate of mobile layer on sample side: 1.0 mL/min

Flow rate of mobile layer on reference side: 1.0 mL/min

Sample concentration: 0.1% by mass

Amount of sample injected: 100 μL

Data pickup time: 5 minutes to 45 minutes after injection of sample

Sampling pitch: 300 msec

The monomer conversion rate (%) was determined by calculating the ratio of the peak surface area of the polymer to the total peak surface area of the monomer and the polymer in the GPC chart.

Comparative Example 1

A polymer was obtained in the same manner as in Example 1, except that an SUS316 tube having an outer diameter of ⅛ inch, an inner diameter of 2.17 mm, and a length of 12 m was used as the reaction tube (4) (except that a static mixer was not connected). The obtained polymer had a number-average molecular weight of 67,000, a monomer conversion rate of 96%, and a molecular weight distribution (dispersity, Mw/Mn) of 1.11.

The results of Comparative Example 1 agree with the number-average molecular weight, monomer conversion rate, and molecular weight distribution of the polymer at the inlet port of the static mixer (end of upstream side in a case where the three connected static mixers are regarded as a single static mixer) under the conditions of Example 1.

Through the comparison between Example 1 and Comparative Example 1, it has been found that in a case where the static mixer is disposed at a specific position of the reaction tube, it is possible to obtain a polymer having a monomer conversion rate of 100% and to narrow the molecular weight distribution.

Even though the length of the reaction tube was set to 14 m in Comparative Example 1, the monomer conversion rate and molecular weight distribution of the obtained polymer were the same as those in Comparative Example 1.

Example 2

A polymer was obtained in the same manner as in Example 1, except that in Example 1, the type of liquid, the liquid feeding conditions, and the reaction tube (4) were changed as follows.

Liquid A (1.4 M-meta-tert-butoxystyrene/THF): 129 mL/min

Liquid B (0.08 M-nBuLi/toluene): 18 mL/min

Polymerization terminator (0.5 M-MeOH/THF): 107 mL/min

Reaction Tube (4):

From the upstream side to the downstream side, (i) SUS316 tube having an outer diameter of ⅛ inch, an inner diameter of 2.17 mm, and a length of 0.2 m and (ii) four static mixers (manufactured by NORITAKE CO., LIMITED, diameter of inner cross section of the tube: 6 mm, length: 34 cm, 27-stage mixing element) arranged in series were connected in this order.

Extraction:

From the outlet of the pipe line (5), 10 mL of a solution containing a polymer was collected, and the molecular weight and the molecular weight distribution of the polymer were measured by gel permeation chromatography (GPC). As a result, the number-average molecular weight (Mn) was 22,000, the monomer conversion rate was 100%, and the molecular weight distribution (dispersity, Mw/Mn) was 1.05.

Comparative Example 2A

A polymer was obtained in the same manner as in Example 2, except that an SUS316 tube having an outer diameter of ⅛ inch, an inner diameter of 2.17 mm, and a length of 0.2 m was used as the reaction tube (4) (except that static mixers were not connected). The obtained polymer had a number-average molecular weight of 5,000, a monomer conversion rate of 28%, and a molecular weight distribution (dispersity, Mw/Mn) of 1.07.

The results of Comparative Example 2 agree with the number-average molecular weight, monomer conversion rate, and molecular weight distribution of the polymer at the inlet port of the static mixer (end of upstream side in a case where the four connected static mixers are regarded as a single static mixer) under the conditions of Example 2.

Comparative Example 2B

A polymer was obtained in the same manner as in Example 2, except that the mixing element was removed from the static mixer used as the reaction tube (4) (that is, the static mixer was in the form of simple tube). The obtained polymer had a number-average molecular weight of 21,000, a monomer conversion rate of 96%, and a molecular weight distribution (dispersity, Mw/Mn) of 1.09.

Through the comparison between Example 2 and Comparative Example 2B, it has been found that in a case where the static mixer is disposed at a specific position of the reaction tube, it is possible to obtain a polymer having a monomer conversion rate of 100% and to narrow the molecular weight distribution.

Example 3

A polymer was obtained in the same manner as in Example 2, except that in Example 2, the liquid feeding conditions and the reaction tube (4) were changed as follows.

Liquid A (1.4 M-meta-tert-butoxystyrene/THF): 129 mL/min

Liquid B (0.08 M-nBuLi/toluene): 36 mL/min Polymerization terminator (0.5 M-MeOH/THF): 107 mL/min Reaction Tube (4):

From the upstream side to the downstream side, (i) SUS316 tube having an outer diameter of ⅛ inch, an inner diameter of 2.17 mm, and a length of 0.1 m and (ii) four static mixers (manufactured by NORITAKE CO., LIMITED, diameter of inner cross section of the tube: 6 mm, length: 34 cm, 27-stage mixing element) arranged in series were connected in this order.

Extraction:

From the outlet of the pipe line (5), 10 mL of a solution containing a polymer was collected, and the molecular weight and the molecular weight distribution of the polymer were measured by gel permeation chromatography (GPC). As a result, the number-average molecular weight (Mn) was 10,500, the monomer conversion rate was 100%, and the molecular weight distribution (dispersity, Mw/Mn) was 1.06.

Comparative Example 3A

A polymer was obtained in the same manner as in Example 3, except that an SUS316 tube having an outer diameter of ⅛ inch, an inner diameter of 2.17 mm, and a length of 0.1 m was used as the reaction tube (4) (except that static mixers were not connected). The obtained polymer had a number-average molecular weight of 2,000, a monomer conversion rate of 15%, and a molecular weight distribution (dispersity, Mw/Mn) of 1.10.

The results of Comparative Example 3 agree with the number-average molecular weight, monomer conversion rate, and molecular weight distribution of the polymer at the inlet port of the static mixer (end of upstream side in a case where the four connected static mixers are regarded as a single static mixer) under the conditions of Example 3.

Comparative Example 3B

A polymer was obtained in the same manner as in Example 3, except that the mixing element was removed from the static mixer used as the reaction tube (4) (that is, the static mixer was in the form of simple tube). The obtained polymer had a number-average molecular weight of 9,500, a monomer conversion rate of 97%, and a molecular weight distribution (dispersity, Mw/Mn) of 1.09.

Through the comparison between Example 3 and Comparative Example 3B, it has been found that in a case where the static mixer is disposed at a specific position of the reaction tube, it is possible to obtain a polymer having a monomer conversion rate of 100% and to narrow the molecular weight distribution.

Reference Example 1A

A polymer was obtained in the same manner as in Example 2, except that in Example 2, the liquid feeding conditions and the reaction tube (4) were changed as follows.

Liquid A (1.4 M-meta-tert-butoxystyrene/THF): 130 mL/min

Liquid B (0.08 M-nBuLi/toluene): 36 mL/min

Polymerization terminator (0.5 M-MeOH/THF): 180 mL/min

Reaction Tube (4):

From the upstream side to the downstream side, (i) SUS316 tube having an outer diameter of ⅛ inch, an inner diameter of 2.17 mm, and a length of 0.02 m and (ii) three static mixers (manufactured by NORITAKE CO., LIMITED, diameter of inner cross section of the tube: 3.4 mm, length: 13.5 cm, 24-stage mixing element) arranged in series were connected in this order.

Extraction:

From the outlet of the pipe line (5), 10 mL of a solution containing a polymer was collected, and the molecular weight and the molecular weight distribution of the polymer were measured by gel permeation chromatography (GPC). As a result, the number-average molecular weight (Mn) was 1,100, the monomer conversion rate was 5%, and the molecular weight distribution (dispersity, Mw/Mn) was 1.19.

Reference Example 1B

A polymer was obtained in the same manner as in Reference Example 1A, except that the mixing element was removed from the static mixer used as the reaction tube (4) (that is, the static mixer was in the form of simple tube). The obtained polymer had a number-average molecular weight of 1,120, a monomer conversion rate of 5%, and a molecular weight distribution (dispersity, Mw/Mn) of 1.19.

Through the comparison between Reference Examples 1A and 1B, it has been found that in a case where the molecular weight of the obtained polymer is smaller than the molecular weight specified by the present invention, even though a static mixer is incorporated into the reaction tube, a monodisperse molecular weight distribution is not obtained.

Example 4

A polymer was obtained in the same manner as in Example 2, except that in Example 2, the type of liquid, the liquid feeding conditions, the anionic polymerizable monomer supply flow path (1), the anionic polymerization initiator supply flow path (2), the reaction tube (4), and the joining portion (C2) were changed as follows, and the temperature was set as follows. In the reaction systems of Example 4 and Examples 5 to 10 which will be described later, the reaction tube is designed such that the number-average molecular weight of the polymer at the inlet port of the static mixer is equal to or higher than 2,000.

Liquid A (1.8 M-meta-tert-butoxystyrene/THF): 120 mL/min

Liquid B (0.03 M-nBuLi/toluene): 60 mL/min

Polymerization terminator (1.0 M-MeOH/THF): 80 mL/min

Anionic Polymerizable Monomer Supply Flow Path (1):

The flow path (1) had a structure established by dividing a single SUS tube into two parts by using a T-shaped connector.

More specifically, a T-connector (U-429, inner diameter 1.0 mm) manufactured by Upchurch Scientific was connected to an SUS316 tube having an outer diameter of ⅛ inch, an inner diameter of 2.17 mm, and a length of 10 m. Furthermore, two SUS 316 tubes each having an outer diameter of 1/16 inch, an inner diameter of 1.0 mm, and a length of 5 cm were connected to the T-connector such that the tubes faced each other, thereby preparing the anionic polymerizable monomer supply flow path (1).

Anionic Polymerization Initiator Supply Flow Path (2):

An SUS316 tube was used which has an outer diameter of ⅛ inches, an inner diameter of 2.17 mm, and a length of 10 m.

Reaction Tube (4):

From the upstream side to the downstream side, (i) SUS316 tube having an outer diameter of ⅛ inch, an inner diameter of 2.17 mm, and a length of 30 m and (ii) three static mixers (manufactured by NORITAKE CO., LIMITED, diameter of inner cross section of the tube: 6 mm, length: 34 cm, 27-stage mixing element) arranged in series were connected in this order. The three static mixers were connected using an SUS316 tube having an outer diameter of ⅛ inch, an inner diameter of 2.17 mm, and a length of 3 cm.

Joining Portion (C2):

UNION TEE (SS-200-3, inner diameter: 2.3 mm) manufactured by Swagelok Company was used.

The reaction tube (4) and the polymerization terminator supply flow path (3) were connected to two connection ports facing each other among three connection ports of UNION TEE (T-shaped connector) described above. The remaining connection port was used as an outlet for discharging a liquid (connection port for the pipe line (5)).

Temperature Setting:

The anionic polymerizable monomer supply flow path (1), the anionic polymerization initiator supply flow path (2), and the joining portion (C3) were arranged in a low-temperature constant-temperature tank, and the temperature thereof was set to 20° C.

Furthermore, the reaction tube (4) (including a static mixer), the polymerization terminator supply flow path (3), the joining portion (C2), and the pipe line (5) were immersed in a dry ice/methanol bath at −50° C.

In Example 4, the obtained polymer had a number-average molecular weight of 22,000, a monomer conversion rate of 100%, and a molecular weight distribution (dispersity, Mw/Mn) of 1.03.

Example 5

A polymer was obtained in the same manner as in Example 4, except that in Example 4, all of the anionic polymerizable monomer supply flow path (1), the anionic polymerization initiator supply flow path (2), the joining portion (C3), the reaction tube (4), the polymerization terminator supply flow path (3), the joining portion (C2), and the pipe line (5) were arranged in a low-temperature constant-temperature tank set to −10° C. The obtained polymer had a number-average molecular weight of 21,500, a monomer conversion rate of 100%, and a molecular weight distribution (dispersity, Mw/Mn) of 1.07.

Example 6

A polymer was obtained in the same manner as in Example 4, except that in Example 4, the type of liquid, the liquid feeding conditions, and the reaction tube (4) were changed as follows, and the temperature was set as follows.

Liquid A (1.4 M-para-tert-butoxystyrene/THF): 110 mL/min

Liquid B (0.026 M-nBuLi/toluene): 71 mL/min

Polymerization terminator (1.0 M-MeOH/THF): 56 mL/min

Reaction Tube (4):

From the upstream side to the downstream side, (i) SUS316 tube having an outer diameter of ⅛ inch, an inner diameter of 2.17 mm, and a length of 15 m, (ii) SUS316 tube having an outer diameter of 8 mm, an inner diameter of 6 mm, and a length of 15 m, and (iii) three static mixers (manufactured by NORITAKE CO., LIMITED, diameter of inner cross section of the tube: 6 mm, length: 34 cm, 27-stage mixing element) arranged in series were connected in this order. The three static mixers were connected using an SUS316 tube having an outer diameter of ⅛ inch, an inner diameter of 2.17 mm, and a length of 3 cm.

Temperature Setting:

The anionic polymerizable monomer supply flow path (1), the anionic polymerization initiator supply flow path (2), and the joining portion (C3) were arranged in a low-temperature constant-temperature tank, and the temperature thereof was set to 10° C.

Furthermore, the portion (i) of the reaction tube (4) was immersed in a dry ice/methanol bath at −30° C. In addition, the portions (ii) and (iii) of the reaction tube (4), the polymerization terminator supply flow path (3), the joining portion (C2), and the pipe line (5) were immersed in a dry ice/methanol bath at −50° C.

In Example 6, the obtained polymer had a number-average molecular weight of 15,100, a monomer conversion rate of 100%, and a molecular weight distribution (dispersity, Mw/Mn) of 1.02.

Example 7

A polymer was obtained in the same manner as in Example 6, except that in Example 6, all of the anionic polymerizable monomer supply flow path (1), the anionic polymerization initiator supply flow path (2), the joining portion (C3), the reaction tube (4), the polymerization terminator supply flow path (3), the joining portion (C2), and the pipe line (5) were arranged in a low-temperature constant-temperature tank set to −10° C. The obtained polymer had a number-average molecular weight of 15,000, a monomer conversion rate of 100%, and a molecular weight distribution (dispersity, Mw/Mn) of 1.07.

Example 8

A polymer was obtained in the same manner as in Example 4, except that in Example 4, all of the anionic polymerizable monomer supply flow path (1), the anionic polymerization initiator supply flow path (2), and the joining portion (C3) were arranged in a low-temperature constant-temperature tank, and the temperature thereof was set to 5° C. The obtained polymer had a number-average molecular weight of 22,500 a monomer conversion rate of 100%, and a molecular weight distribution (dispersity, Mw/Mn) of 1.04.

Example 9

A polymer was obtained in the same manner as in Example 4, except that in Example 4, the reaction tube (4) (including a static mixer), the polymerization terminator supply flow path (3), the joining portion (C2), and the pipe line (5) were immersed in a dry ice/methanol bath at −10° C. The obtained polymer had a number-average molecular weight of 22,800, a monomer conversion rate of 100%, and a molecular weight distribution (dispersity, Mw/Mn) of 1.04.

Example 10

A polymer was obtained in the same manner as in Example 6, except that in Example 6, all of the anionic polymerizable monomer supply flow path (1), the anionic polymerization initiator supply flow path (2), and the joining portion (C3) were arranged in a low-temperature constant-temperature tank, the temperature thereof was set to 30° C., and the portions (i) to (iii) of the reaction tube (4), the polymerization terminator supply flow path (3), the joining portion (C2), and the pipe line (5) were immersed in a dry ice/methanol bath at −10° C. The obtained polymer had a number-average molecular weight of 16,200 a monomer conversion rate of 100%, and a molecular weight distribution (dispersity, Mw/Mn) of 1.04.

Hitherto, the present invention has been described together with the embodiments thereof. However, unless otherwise specified, the present invention is not limited to any of the description of the present invention. The inventors of the present invention consider that the present invention should be interpreted widely without departing from the gist and scope of the present invention described in the attached claims.

EXPLANATION OF REFERENCES

100, 200 flow-type reaction system
I, II, III inlet port
1 anionic polymerizable monomer supply flow path
2 anionic polymerization initiator supply flow path
3 polymerization terminator supply flow path
4 reaction tube
M static mixer
5 pipe line
C1, C2, C3 joining portion
R1 low-temperature constant-temperature tank

What is claimed is:

1. A method for manufacturing a polymer in which anionic polymerization reaction is performed by a flow-type reaction, the method comprising:
    introducing a liquid A containing an anionic polymerizable monomer, a liquid B containing an anionic polymerization initiator, and a polymerization terminator into different flow paths;
    allowing the liquids to flow in the flow paths;
    allowing the liquid A and the liquid B to join together;
    subjecting the anionic polymerizable monomer to anionic polymerization while the liquids having joined together are flowing to downstream in a reaction flow path;
    allowing a solution, which is obtained by the polymerization reaction and flows in the reaction flow path, and the polymerization terminator to join together so as to terminate the polymerization reaction and to obtain a polymer having a number-average molecular weight of 5,000 to 200,000,
    wherein a static mixer is disposed in the reaction flow path, and a polymer having a number-average molecular weight equal to or greater than 2,000 is introduced into an inlet port of the static mixer.

2. The method for manufacturing a polymer according to claim 1,
    wherein a flow rate at which the liquid B is introduced is higher than 10 mL/min and equal to or lower than 2,000 mL/min.

3. The method for manufacturing a polymer according to claim 1,
    wherein both the flow path through which the liquid A flows and the flow path through which the liquid B flows have an equivalent diameter of 1 to 10 mm.

4. The method for manufacturing a polymer according to claim 1,
    wherein a monomer conversion rate is equal to or higher than 1.0% at the inlet port of the static mixer.

5. The method for manufacturing a polymer according to claim 1,
    wherein an equivalent diameter of the static mixer is 2 to 100 mm.

6. The method for manufacturing a polymer according to claim 1,
    wherein a length of the reaction flow path is 3 to 100 m.

7. The method for manufacturing a polymer according to claim 1,
    wherein the number of flow paths which are connected to a joining portion of the liquid A and the liquid B and through which the liquid A flows and the number of flow paths which are connected to the joining portion of the liquid A and the liquid B and through which the liquid B flows is 3 to 10 in total.

8. The method for manufacturing a polymer according to claim 1,
    wherein at least one organic lithium compound or at least one organic magnesium compound is used as the anionic polymerization initiator.

9. The method for manufacturing a polymer according to claim 1,
    wherein n-butyllithium is used as the anionic polymerization initiator.

10. The method for manufacturing a polymer according to claim 1,
wherein the liquid B contains an aromatic hydrocarbon.

11. A flow-type reaction system for manufacturing a polymer by an anionic polymerization reaction, the system comprising:
- a first flow path through which an anionic polymerizable monomer flows;
- a second flow path through which an anionic polymerization initiator flows;
- a third flow path through which a polymerization terminator flows;
- a first joining portion where the first flow path and the second flow path join together;
- a reaction tube connected to downstream of the first joining portion;
- a second joining portion where the reaction tube and the third flow path join together; and
- a pipe line connected to downstream of the second joining portion,
- wherein a static mixer is disposed in the reaction tube,
- a polymer having a number-average molecular weight equal to or greater than 2,000 is introduced into an inlet port of the static mixer, and
- a polymer having a number-average molecular weight of 5000 to 200,000 is obtained from the pipe line.

* * * * *